United States Patent
Sandstrom

(10) Patent No.: US 11,382,319 B1
(45) Date of Patent: *Jul. 12, 2022

(54) SPINNING TYPE FISHING REEL WITH BI-DIRECTIONALLY ROTATING ROTOR AND DRAG CONTROL TO PREVENT LINE TWIST

(71) Applicant: Thomas Sandstrom, Oakland Park, FL (US)

(72) Inventor: Thomas Sandstrom, Oakland Park, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/131,120

(22) Filed: Dec. 22, 2020

Related U.S. Application Data

(63) Continuation of application No. 16/713,213, filed on Dec. 13, 2019, now Pat. No. 10,869,467, which is a continuation of application No. 16/218,998, filed on Dec. 13, 2018, now abandoned.

(60) Provisional application No. 62/598,014, filed on Dec. 13, 2017.

(51) Int. Cl.
| | |
|---|---|
| *A01K 89/01* | (2006.01) |
| *A01K 89/0155* | (2006.01) |
| *A01K 89/016* | (2006.01) |
| *A01K 89/015* | (2006.01) |

(52) U.S. Cl.
CPC ...... *A01K 89/0155* (2013.01); *A01K 89/0162* (2015.05); *A01K 89/01931* (2015.05)

(58) Field of Classification Search
CPC ............ A01K 89/0155; A01K 89/0162; A01K 89/01931; A01K 89/0114; A01K 89/0117; A01K 89/0126; A01K 89/028; A01K 89/029
See application file for complete search history.

(56) References Cited

U.S. PATENT DOCUMENTS

| | | |
|---|---|---|
| 3,814,349 A | 6/1974 | Menne |
| 4,328,937 A | 5/1982 | Holahan et al. |
| 4,402,469 A * | 9/1983 | Stiner .................. A01K 89/027 242/245 |
| 4,416,427 A | 11/1983 | Kawai |
| 4,436,254 A | 3/1984 | Normann |
| 4,535,953 A | 8/1985 | Omori |
| 4,577,807 A | 3/1986 | Urso |
| 4,634,074 A | 1/1987 | Ohmori |
| 4,892,267 A | 1/1990 | Webb |
| 5,118,048 A | 6/1992 | Childre et al. |
| 5,277,379 A | 1/1994 | Kaneko |
| 6,021,970 A | 2/2000 | Fritts et al. |
| 6,179,236 B1 | 1/2001 | Jang |

(Continued)

*Primary Examiner* — Emmanuel M Marcelo
(74) *Attorney, Agent, or Firm* — Mark D. Bowen; Malin Haley DiMaggio & Bowen, P.A.

(57) ABSTRACT

A fishing spinning reel that eliminates problems associated with line twist by providing a rotor adapted for both forward and reverse rotation wherein a drag assembly applies drag to the rotor using an adjustable cam mechanism to prevent the rotor from imparting twist on the line when in the winding mode. By enabling the rotor to rotate in a reverse direction with the application of drag the present invention prevents line twist when fighting a fish by allowing the rotor to rotate in a reverse direction to let out line and/or to remain stationary as the handle is cranked thereby preventing the rotor from imparting twist on the line.

6 Claims, 4 Drawing Sheets

(56) References Cited

U.S. PATENT DOCUMENTS

| | | |
|---|---|---|
| 7,178,751 B1 | 2/2007 | Isaacs |
| 7,234,660 B2 | 6/2007 | Kitajima et al. |
| 8,469,300 B2 | 6/2013 | Camp |
| 8,783,596 B2 | 7/2014 | Kendra |
| 8,919,684 B1 | 12/2014 | Alzamora et al. |
| 9,119,384 B2 | 9/2015 | Harris |
| 10,869,467 B1 * | 12/2020 | Sandstrom ......... A01K 89/0162 |
| 2016/0270381 A1 | 9/2016 | Saito |

\* cited by examiner

SPINNING TYPE FISHING REEL WITH BI-DIRECTIONALLY ROTATING ROTOR AND DRAG CONTROL TO PREVENT LINE TWIST

CROSS REFERENCE TO RELATED APPLICATIONS

This application is a continuation of U.S. patent application Ser. No. 16/713,213, filed on Dec. 13, 2019, now U.S. Pat. No. 10,869,467, which is a continuation of U.S. patent application Ser. No. 16/218,998, filed on Dec. 13, 2018, now abandoned, which claims the benefit of provisional U.S. Patent Application Ser. No. 62/598,014, filed on Dec. 13, 2017.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates to fishing reels, and more particularly to a spinning type fishing reel having a drag controlled bi-directionally rotating rotor to prevent line twist.

2. DESCRIPTION OF RELATED ART

A spinning reel is a common type of fishing reel. Conventional spinning reels are characterized as having a body assembly with an open-faced spool disposed with an axis in generally parallel relation with the fishing pole. A rotor is disposed in surrounding relation with the spool and includes a bail arm having a line guide for guiding the fishing line onto the spool. The bail arm is pivotable between an open position for casting, and a closed position for reeling the line back onto the spool. A crank having a handle is mounted to one side of the body assembly and functions to reel in the fishing line. A drive gear actuated by the crank is coupled to a pinion gear coupled to the rotor to cause rotation thereof to wind the line back on to the spool. A spool shaft passes axially through an axial aperture defined in pinion gear and is attached to the spool. The spool shaft is caused to reciprocate by an oscillation gear and slider coupling driven by the crank. The body assembly and mechanisms are preferably designed such that the crank may be mounted on either side of the spool to accommodate both left and right-handed fishermen. With a conventional spinning reel, rotation of the crank causes the rotor to rotate relative to the spool whereby fishing line, guided by the line guide affixed to the bail, is wound onto the spool. At the same time the spool axially oscillates relative to the rotor, and more particularly, to the line guide so as to result in even winding of the line about the spool.

A significant problem associated with conventional spinning reels relates to the inducement of line twist due to the winding motion of the rotor and line guide about the rotationally stationary spool. The amount of line twist increases significantly when the drag setting and force on the line is such that the rotor spins while the line is relatively stationary and/or being reeled in, or let out, slowly. Excessive line twist results in backlashes and birds nest entanglements that render the line unusable. In order to eliminate the accumulated twist, the fisherman must often let out the line to relieve the twist and reel the line back in evenly.

Accordingly, there exists a need in the art for advancements to spinning reels that eliminate the problems related to line twist.

BRIEF SUMMARY OF THE INVENTION

The present invention overcomes the limitations and disadvantages present with conventional fishing reels by providing an improved spinning reel that eliminates problems associated with line twist by providing a rotor adapted for both clockwise and counterclockwise rotation wherein a drag assembly applies drag to the rotor to prevent the rotor from imparting twist on the line when in the winding mode. By enabling the rotor to rotate in a reverse direction with the application of drag the present invention prevents line twist when fighting a fish by allowing the rotor to rotate in a reverse direction and/or to remain stationary as the handle is cranked thereby preventing the rotor from imparting twist on the line.

Accordingly, it is an object of the present invention to provide an improved spinning reel for fishing.

It is another object of the present invention to provide a modified spinning reel having a bi-directionally rotating rotor.

Still another object of the present invention is to provide a spinning reel wherein a drag mechanism is configured to apply adjustable drag to the rotor thereby taking the rotor out of sync with the winding crank.

In accordance with these and other objects, which will become apparent hereinafter, the instant invention will now be described with particular reference to the accompanying drawings.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within the ranges as if each numerical value and sub-range is explicitly recited. As an illustration, a numerical range of "about 1 to 5" should be interpreted to include not only the explicitly recited values of about 1 to about 5, but also include individual values such as 2, 3, and 4 and sub-ranges such as from 1-3, from 2-4, and from 3-5, etc. as well as 1, 2, 3, 4, and 5, individually. The same principle applies to ranges reciting only one numerical value as a minimum or maximum. Furthermore, such an interpretation should apply regardless of the breadth of the range or the characteristics being described.

Figure 1:
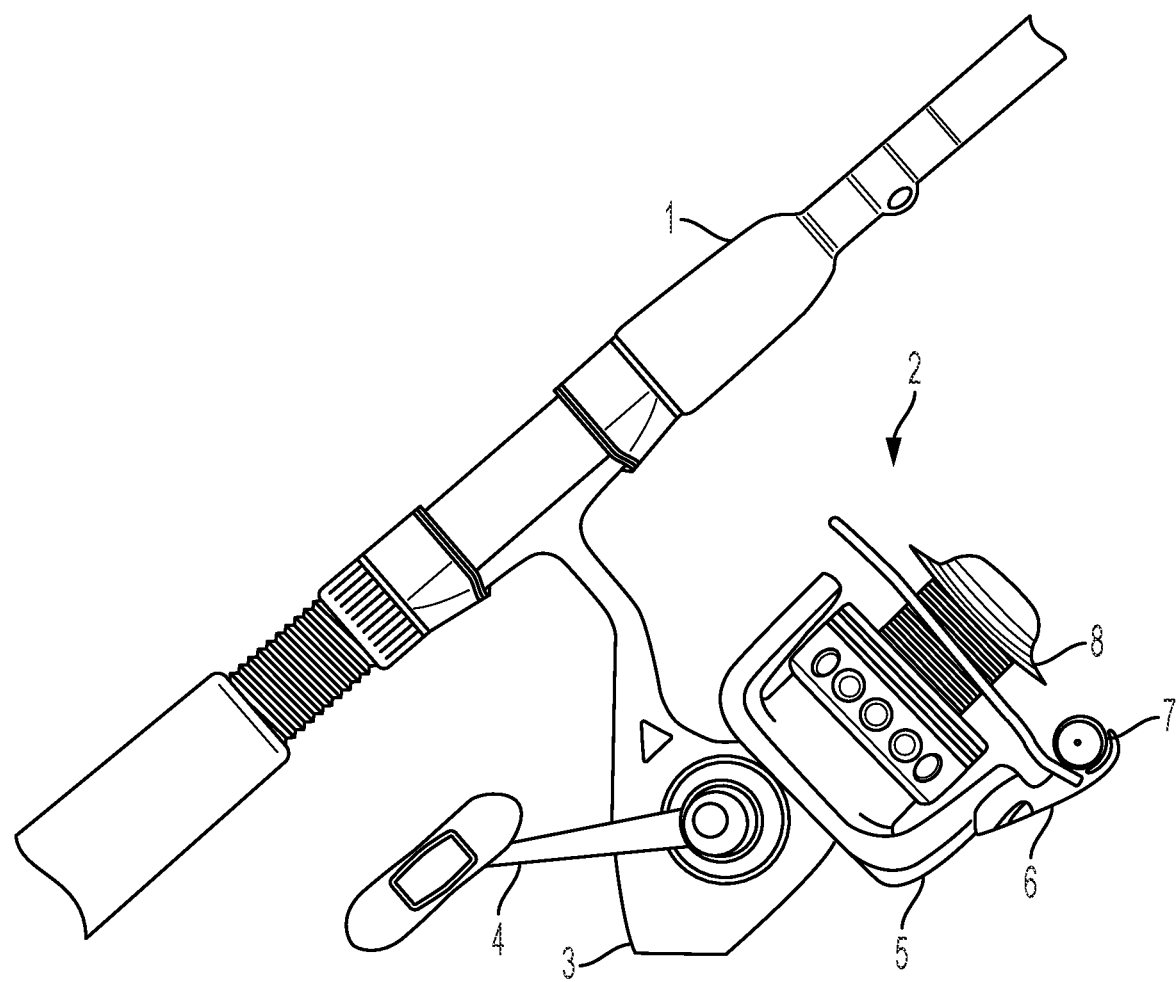
FIG. 1 is a photographic illustration of a fishing rod adapted with a spinning reel in accordance with the prior art.

With reference now to the drawings, FIG. 1 is a photographic illustration of a fishing rod 1 adapted with a spinning reel 2 in accordance with the prior art. Spinning reel 2 includes a body 3, a hand crank 4, a rotor 5 including a bail assembly 6 pivotally connected thereto, and wherein the bail assembly includes a line guide 7, and an open-face spool 8 disposed with an axis in generally parallel relation with a fishing pole. Rotation of hand crank 4 causes rotor 5 and line guide 7 to rotate in a line winding mode, while further causing spool 8 to reciprocate in an axial direction to cause the line to wound on the spool evenly.

Figure 2:
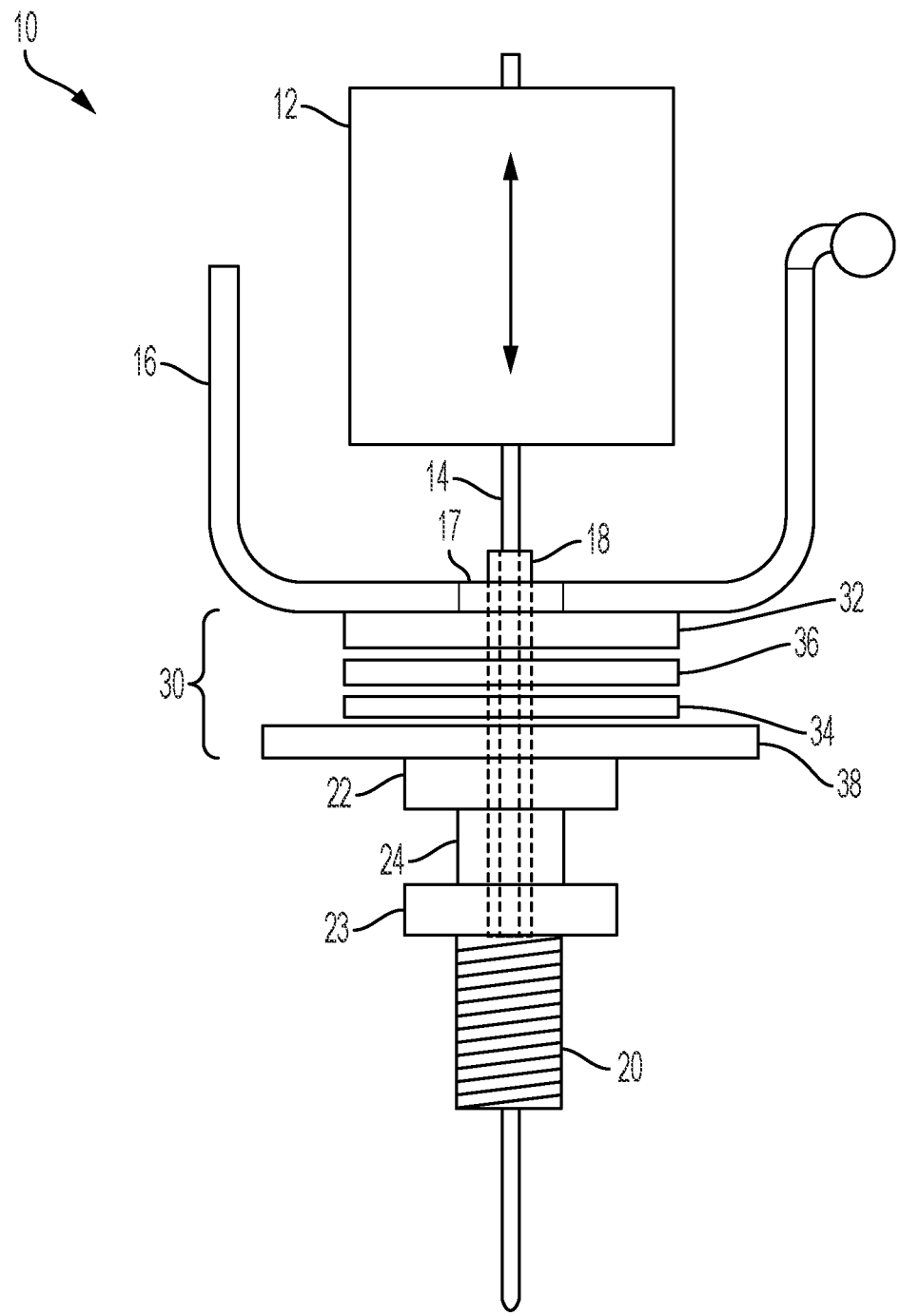
FIG. 2 is a schematic illustration of a basic spinning type fishing reel configured with a bi-directionally rotating rotor and rotor drag mechanism in accordance with the present invention.

FIG. 2 is a basic schematic illustration of relevant components of a spinning type fishing reel, generally referenced as 10, adapted with a bi-directionally rotating rotor with a rotor drag system in accordance with the present invention. As seen in FIG. 2, fishing reel 10 includes a spool 12 affixed to a shaft 14 such that spool 12 reciprocates up and down as indicated by the arrow illustrated on spool 12. Shaft 14 is mechanically connected to a slider or other reciprocating mechanism (not shown) actuated by the fishing reel crank as is known in the art. A rotor 16 is disposed in surrounding relation with spool 12. Rotor 16 has an axially disposed ball bearing 17 which receives a rotor shaft 18 which is driven by the reel crank. Rotor shaft 18 comprises a tubular shaft and receives spool shaft 14 axially disposed therein. Rotor shaft 18 is driven by a gear 20, which in turn is driven by the fishing reel hand crank (not shown). Rotor shaft 18 is further supported by a pair of ball bearings, referenced as 22 and 23, disposed on opposing sides of a rotor anti-reverse bearing 24. The anti-reverse bearing 24 prevents reverse rotation of hand crank 4 when the reel is in a winding mode. As further discussed below, however, reverse rotation of rotor 16 is permitted in accordance with the teachings of the present invention.

A drag assembly, generally referenced as 30, is provided for rotor 16. Drag assembly 30 includes a pair of drag plates, including a first drag plate 32 and a second drag plate 34, with a drag washer 36 disposed therebetween and keyed to the rotor shaft. First drag plate 32 is affixed to rotor 16 by suitable fastening means, such as mechanical fasteners. Second drag plate 34 is connected to a drag adjuster 38. Variations on the number of drag plates and washers are considered within the scope of the present invention. As should be apparent, drag assembly operates on rotor 16 when rotating in the reverse direction, such as when fighting a fish. In this basic embodiment, drag adjuster 38 is in threaded engagement with rotor shaft 18 below and adjacent to second drag plate 34. Clockwise rotation of drag adjuster 38 compresses drag plates 32 and 34 upon drag washer 36 thereby increasing drag force. Conversely, counter-clockwise rotation of drag adjuster 38 reduces the drag force applied to rotor 16 by increasing the spacing between drag plates 32 and 34.

The present invention thus provides a fishing spinning reel that prevents twist from being induced on the fishing line by allowing reverse rotation of the rotor with reverse rotation resistance provided by drag assembly 30. Thus, when fighting each hand crank rotation will not necessarily result in a corresponding rotation of rotor 16. By limiting rotor revolutions, the rotor imparts less, if any, line twist on the fishing line. Preventing line twist is significant in preventing line twist induced entanglements and thus avoids the time wasted by the fisherman untangling and relieving line twist.

Figure 3:
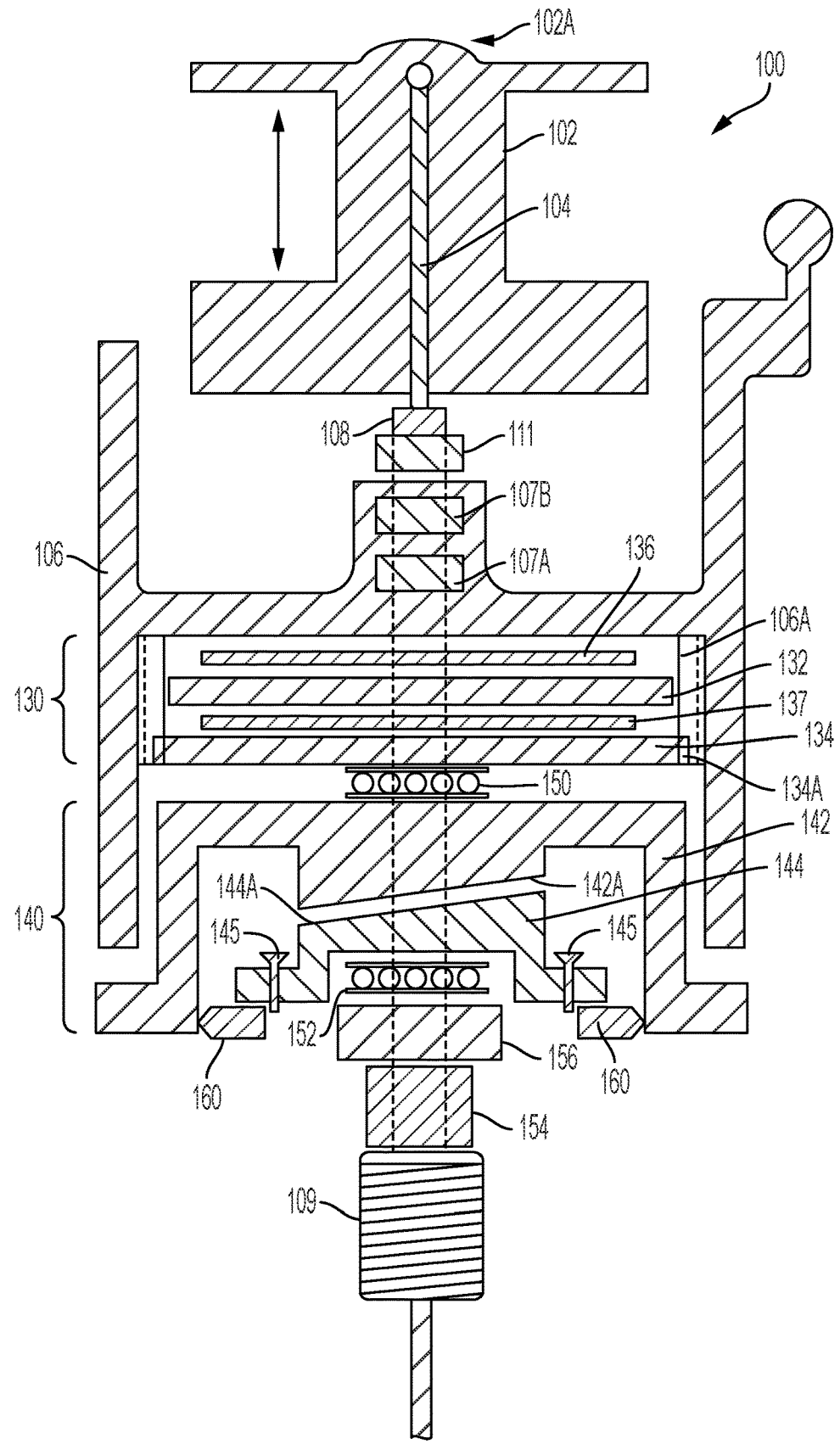
FIG. 3 is a schematic illustration of an alternate embodiment spinning type fishing reel configured with a cam actuated rotor drag mechanism.

FIG. 3 is a schematic sectional illustration of relevant components of an alternate embodiment spinning type fishing reel, generally referenced as 100, adapted with a bi-directionally rotating rotor with a rotor drag system in accordance with the present invention. As seen in FIG. 3, fishing reel 100 includes a spool 102 affixed and keyed to a spool shaft 104 such that spool 102 reciprocates up and down as indicated by the arrow illustrated on spool 102. Spool 102 is keyed to shaft 104 to prevent the spool from rotation about the shaft. In a preferred embodiment, spool 102 includes a push button release 102A, which, upon actuation, functions to release spool 102 from spool shaft 104 to allow quick release and replacement of the spool. Spool shaft 104 is mechanically connected to a slider or other reciprocating mechanism (not shown) actuated by the fishing reel crank as is known in the art. The mechanical coupling of shaft 104 to the reel hand crank/handle may be accomplished by any suitable mechanical components, including gears or a combination of one or more gears linked to a pivotal member as is known in the art. A rotor 106 is disposed in concentric relation to spool 102 as seen in FIG. 3. Rotor 106 is actuated by a rotor shaft 108. Rotor shaft 108 is disposed in outer concentric relation with spool shaft 104. Rotor Shaft 108 is threaded at the distal/top portion thereof and has a worm gear 109 disposed at the proximal end thereof. Worm gear is driven by the reel hand crank (not shown in FIG. 3) via suitable mechanical linkage as is known in the art.

Rotor 106 is mounted to rotor shaft 108 via first and second axially disposed bearings, referenced as 107A and 107B. Bearings 107A and 107B are preferably ball bearings, however, roller bearings, or any suitable equivalent is considered within the scope of the present invention. It is important that at least two bearings, namely bearings 107A and 107B, be provided as the present inventor found that use of a single bearing resulted in unsatisfactory rotor rotation upon an application of force on the fishing line. More particularly, if rotor 106 is mounted to shaft 108 using a single bearing (107), force transferred to rotor 106 from fishing line under tension has been found to cause the rotor to wobble out of axial alignment with shaft 108 thereby causing the rotor to bind thus preventing the single bearing from allowing generally free rotation. An internally threaded nut 111 is disposed in threaded engagement with threaded upper portion of shaft 108 secures rotor 106 to prevent distally axial movement thereof relative to shaft 108. Rotor shaft 108 is driven by worm gear 109, which in turn is driven by the fishing reel hand crank (not shown) as is known in the art.

A drag assembly, referenced as 130, is provided to apply adjustable drag force to rotor 106. Drag assembly 130 includes a pair of drag plates, including a first/upper drag plate 132, a second/lower drag plate 134, along with a pair of drag washers, referenced as 136 and 137. First drag plate 132 is connected to rotor shaft 108, preferably via inner keyed connection. Further, second drag plate 134 is connected to rotor 106, preferably via outer keyed connection. More particularly, drag plate 134 includes a radially outwardly projecting tab 134A which is received in and capable of riding along a longitudinal slot 106A formed on an inner surface of rotor 106. First drag washer 136 is disposed between rotor 106 and first drag washer 132, and second drag washer is disposed between first drag plate 132 and second drag plate 134. The drag washers and drag plates comprise friction plates or disks, namely a plate or disk having an operative surface formed of material having a high coefficient of friction. As should be apparent, variations on the number of drag plates and washers are considered within the scope of the present invention.

Drag assembly 130 operates on rotor 106 to apply user selected drag force thereto, typically when rotor 106 is urged to rotate in a reverse direction, such as when fighting a fish. In the embodiments depicted in FIGS. 3 and 4, a drag adjustment mechanism, generally referenced as 140, utilizes a cam mechanism to axially increase and decrease the application of drag. More particularly, drag adjustment mechanism 140 is user adjustable to increase and decrease compressive force to on drag assembly 130, namely drag plates and washers, whereby compressive force is used to press drag plates 132 and 134 into compression against drag washers 136 and 137. As should be apparent an increase in compressive force increases the frictional forces realized as the drag plates and drag washers rotate or attempt to rotate relative to one another in face-to-face engagement.

In accordance with this aspect of the present invention drag adjustment mechanism 140 includes first/upper and second/lower drag adjustment members, referenced as 142 and 144, which define opposing cam surfaces, referenced as 142A and 144A, shaped to result in axial expansion and contraction upon relative rotation of one cam member relative to the other. First drag adjustment member 142 is rotatably received on rotor shaft 108, with a thrust bearing 150 sandwiched between it and second drag plate 134. The use of a thrust bearing is important for transmitting compressive forces to drag assembly 130 while maintaining smooth rotational action. Second drag adjustment member 144 is disposed substantially adjacent to first drag member 142, such that cam surfaces 142A and 144A, are disposed in face-to-face engagement. In addition, second drag adjustment member is affixed to the reel housing (not shown in FIG. 3) by fasteners 145 so as to remain stationary. A thrust bearing 152 is disposed on the lower end of second drag adjustment member 144 so as to provide a load bearing surface upon which compressive force may be applied when increasing drag. One or more drag clickers, referenced as 160 radially project from drag adjustment member 144, with ends thereof engaging the inner surface of first drag adjustment member 142, to generate a "clicking" sound as member 142 is rotated relative to member 144, wherein the clicking sound provides audible feedback confirming drag adjustment. Further, an anti-reverse bearing 154 and a bearing 156 are sandwiched between thrust bearing 152 and worm gear 109.

Accordingly, rotation of first drag adjustment member 142 in a first direction relative fixed second drag adjustment member 144 results in rotational movement between cam surfaces 142A and 144A thereby resulting in axial extension of first drag member 142 in an axially distal direction whereby compressive force is applied to lower drag plate 134 vis thrust bearing 150. The compressive force is applied to the drag assembly 130 thereby increasing compressive pressure on between the drag plates 132 and 134, and drag washers 136 and 137. Conversely, rotation of first drag adjustment member 142 in a second opposite direction results in rotational movement between cam members 142A and 144A thereby resulting in axial retraction of member 142 whereby compressive force is relaxed thereby decreasing decrease compressive pressure on between the drag plates and drag washers. In the embodiment depicted in FIG. 3, drag adjustment mechanism 142 comprises a cylindrical, hat-shaped member disposed on rotor shaft 108. In a contemplated alternate embodiment, drag mechanism 138 may comprise a radially projecting lever.

Figure 4:
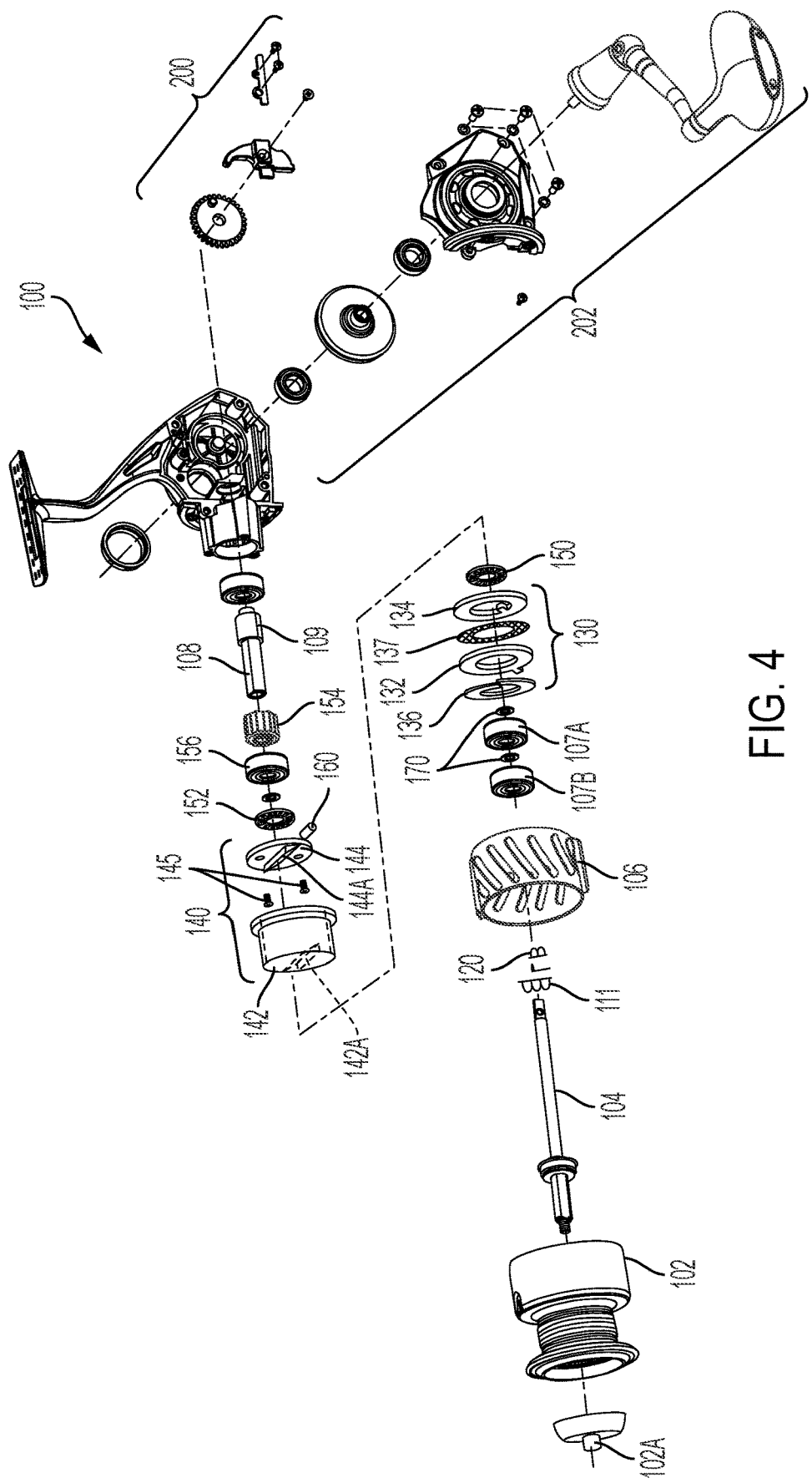
FIG. 4 is an exploded perspective view of a spinning type fishing reel configured with a bi-directionally rotating rotor and cam actuated rotor drag mechanism, showing important components.

FIG. 4 depicts an exploded detailed view, of a spinning reel adapted with a bi-directionally rotating rotor with a rotor drag system in accordance with the present invention. FIG. 4 includes a number of mechanisms and structures discussed above in the discussion of schematic FIG. 3, and the following discussion will use like reference numbers for like components, mechanisms, and structures.

Fishing reel 100 includes a spool 102 affixed and keyed to a shaft 104 such that spool 102 reciprocates up and down. In a preferred embodiment, spool 102 includes a push button release 102A, which, upon actuation, functions to release spool 102 from shaft 104 to allow quick release and replacement of the spool. Shaft 104 is mechanically connected to a slider or other reciprocating mechanism, generally referenced as 200, actuated by the fishing reel crank assembly, referenced as 202, as is known in the art. Rotor 106 is actuated by a threaded rotor shaft 108 having a worm gear 109 disposed at the proximal end thereof. Worm gear is driven by the hand crank assembly 202 via suitable mechanical linkage as is known in the art.

First and second axially disposed bearings, referenced as 107A and 107B, receive rotor shaft 108. A shim is 170 may be disposed between bearings 107A and 107B, and a second shim 170 may be disposed on the proximal side of bearing 107A as best seen in FIG. 4. It is important that at least two bearings, namely bearings 107A and 107B, be provided as the present inventor found that use of a single bearing resulted in unsatisfactory rotor rotation upon an application of force on the fishing line. More particularly, when configured with a single bearing, force transferred to rotor 106 from fishing line under tension caused rotor 106 to wobble out of axial alignment with shaft 108 thereby causing the rotor to bind thus preventing the single bearing from allowing generally friction-free rotation. An internally threaded nut 111 is disposed in threaded engagement with shaft 108 thereby securing rotor 106 to prevent distally axial movement thereof relative to shaft 108. A shim 170 may be disposed between nut 111 and rotor 106. Rotor shaft 108 is driven by worm gear 109, which in turn is driven by the fishing reel handle and crank assembly 202. As noted above, the mechanics for transmitting rotational movement from the handle crank assembly 202 to worm gear 109 are known in the art.

A drag assembly, referenced as 130, is provided to apply adjustable drag force to rotor 106. Drag assembly 130 includes a pair of drag plates, including a first/upper drag plate 132, a second/lower drag plate 134, along with a pair of drag washers, referenced as 136 and 137. First drag plate 132 is connected to rotor shaft 108, preferably via an inside keyed connection wherein drag plate 132 is rotationally fixed relative to shaft 108. Second drag plate 134 has a radially outwardly projecting tab 134A, engages a slot formed in rotor 106, thereby allowing axial movement of first drag plate 132 relative to rotor 106, but not relative rotational movement. While specific keyed configurations are disclosed for drag plates 132 and 134, it should be appreciated that any suitable keyed connection structures are considered within the scope of the present invention. First drag washer 136 is disposed between rotor 106 and first drag plate 132, and second drag washer 137 is disposed between first drag plate 132 and second drag plate 134.

The various drag plates and drag washers, each comprise a friction plate, namely a plate having an operative, preferably planar, surface formed of material having a high coefficient of friction. As should be apparent, variations on the number of drag plates and washers are considered within the scope of the present invention. Further, drag plates and drag washers may be keyed or connected to the rotor and/or shaft 108 in alternate configurations, provided however that an adjustable drag force is controllably formed between rotor 106 and shaft 108.

Drag assembly 130 operates on rotor 106 to apply user selected drag force thereto when rotor 106 is urged to rotate in a reverse direction, such as when the user is fighting a fish. In the embodiment depicted in FIG. 4, a drag adjustment mechanism, generally referenced as 140, utilizes a cam to increase and decrease the application of drag. More particularly, drag adjustment mechanism 140 is user adjustable to increase and decrease compressive force on drag assembly 130, whereby compressive force is used to press drag plates 132 and 134 into compression against drag washers 136 and 137. As should be apparent an increase in compressive force increases the frictional forces realized as the drag plates and drag washers rotate or attempt to rotate relative to one another in face-to-face engagement.

In accordance with this aspect of the present invention drag adjustment mechanism 140 includes first/upper and second/lower drag adjustment members, referenced as 142 and 144, which define opposing cam surfaces, referenced as 142A and 144A, shaped to result in axial expansion and contraction upon relative rotation of one cam member relative to the other. First drag adjustment member 142 is rotatably mounted on gear shaft 108, with a thrust bearing 150 sandwiched between it and second drag plate 134. Second drag adjustment member 144 is received on shaft 108 and disposed substantially adjacent to first drag member 142, such that cam surfaces 142A and 144A, are disposed in face-to-face engagement. In addition, second drag adjustment member is affixed to the reel housing 3 by mechanical fasteners 145 so as to remain stationary. A thrust bearing 152 is disposed on the lower end of second drag adjustment member 144 so as to provide a load bearing surface upon which compressive force may be applied when increasing drag. One or more drag clickers, referenced as 160 radially project from drag adjustment member 144, with ends thereof engaging the inner surface of firsts drag adjustment member 142, to generate a "clicking" sound as member 142 is rotated relative to member 144. Further, an anti-reverse bearing 154 and a bearing 156 are sandwiched between thrust bearing 152 and worm gear 109. A shim 170 may be disposed between thrust bearing 152 and anti-reverse gear 154.

Accordingly, rotation of first drag adjustment member 142 in a first direction relative fixed second drag adjustment member 144 results in rotational movement between cam surfaces 142A and 144A thereby resulting in axial extension of first drag member 142 in an axially distal direction whereby compressive force is applied to lower drag plate 134 vis thrust bearing 150. The compressive force is applied to the drag assembly 130 thereby increasing compressive pressure on between the drag plates 132 and 134, and drag washers 136 and 137. Conversely, rotation of first drag adjustment member 142 in a second opposite direction results in rotational movement between cam members 142A and 144A thereby resulting in axial retraction of member 142 whereby compressive force is relaxed so as to decrease compressive pressure on between the drag plates and drag washers. In the embodiment depicted in FIG. 4, drag adjustment mechanism 142 comprises a cylindrical, hat-shaped member, however, in a contemplated alternate embodiment, drag mechanism 142 may comprise a radially projecting lever.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A spinning reel comprising:
   a body having a hand crank rotatably connected thereto;
   a spool shaft coupled to said hand crank;
   a spool affixed to said spool shaft;
   a rotor disposed in concentric relation with said spool, said rotor rotatably mounted on a rotor shaft by a pair of axially aligned bearings;
   said rotor shaft disposed in radially outward concentric relation with said spool shaft, said rotor shaft coupled to said hand crank and configured to rotate in response to rotation of said hand crank;
   a drag assembly adapted to apply drag force to said rotor; and
   a drag adjustment mechanism configured to adjust drag force applied by said drag assembly to said rotor.

2. The spinning reel according to claim 1, further including a first thrust bearing disposed between said drag assembly and said drag adjustment mechanism, and a second thrust bearing disposed between said drag adjustment mechanism and said reel body.

3. The fishing reel according to claim 1, wherein said drag assembly comprises a plurality of drag plates and drag washers disposed in alternating face-to-face relation, wherein axial compression of said drag assembly applies drag force to said rotor.

4. The fishing reel according to claim 1, wherein said drag adjustment mechanism includes a cam.

5. The fishing reel according to claim 4, wherein said drag mechanism includes first and second drag adjustment members, each of said drag adjustment members defining a cam surface, whereby rotation of one of said drag members relative to the other of said drag members results in axial expansion or contraction of said drag mechanism.

6. The spinning reel according to claim 4, wherein said drag adjustment mechanism comprises first and second drag adjustment members, said first drag adjustment member being rotatably mounted on said rotor shaft, and said second drag adjustment member fixed to said main body, said first and second drag members including projecting cam surfaces disposed in face-to-face relation, whereby rotation of said first drag member relative to said second drag member results in axial separation of said first and second drag members, and wherein said axial separation increases drag force on said rotor created by said drag assembly.

* * * * *